Sept. 9, 1969 F. DIAS ET AL 3,466,386
COLOR DETECTOR
Filed Dec. 30, 1966

Inventors
Fleming Dias
Carl G. Eilers
Jouke N. Rypkema
By Francis W. Crotty
Attorney United States Patent Office 3,466,386

Patented Sept. 9, 1969

3,466,386

COLOR DETECTOR

Fleming Dias, Chicago, Carl G. Eilers, Oak Park, and Jouke N. Rypkema, Lombard, Ill., assignors to Zenith Radio Corporation, Chicago, Ill., a corporation of Delaware Filed Dec. 30, 1966, Ser. No. 606,280
Int. Cl. H04m 5/38, 5/44
U.S. Cl. 178—5.4 6 Claims

ABSTRACT OF THE DISCLOSURE

The specification discloses a color demodulator which utilizes a pair of unijunction transistors with a resistor connecting output terminals of each transistor. The color signal is applied to the inputs of both transistors simultaneously. The reference signals are applied across the output terminals of the transistors. The $R-Y$ and $B-Y$ signals are obtained at the output terminals of the transistors, and the $G-Y$ is obtained from a tap on the intermediate resistor.

Figure 1:
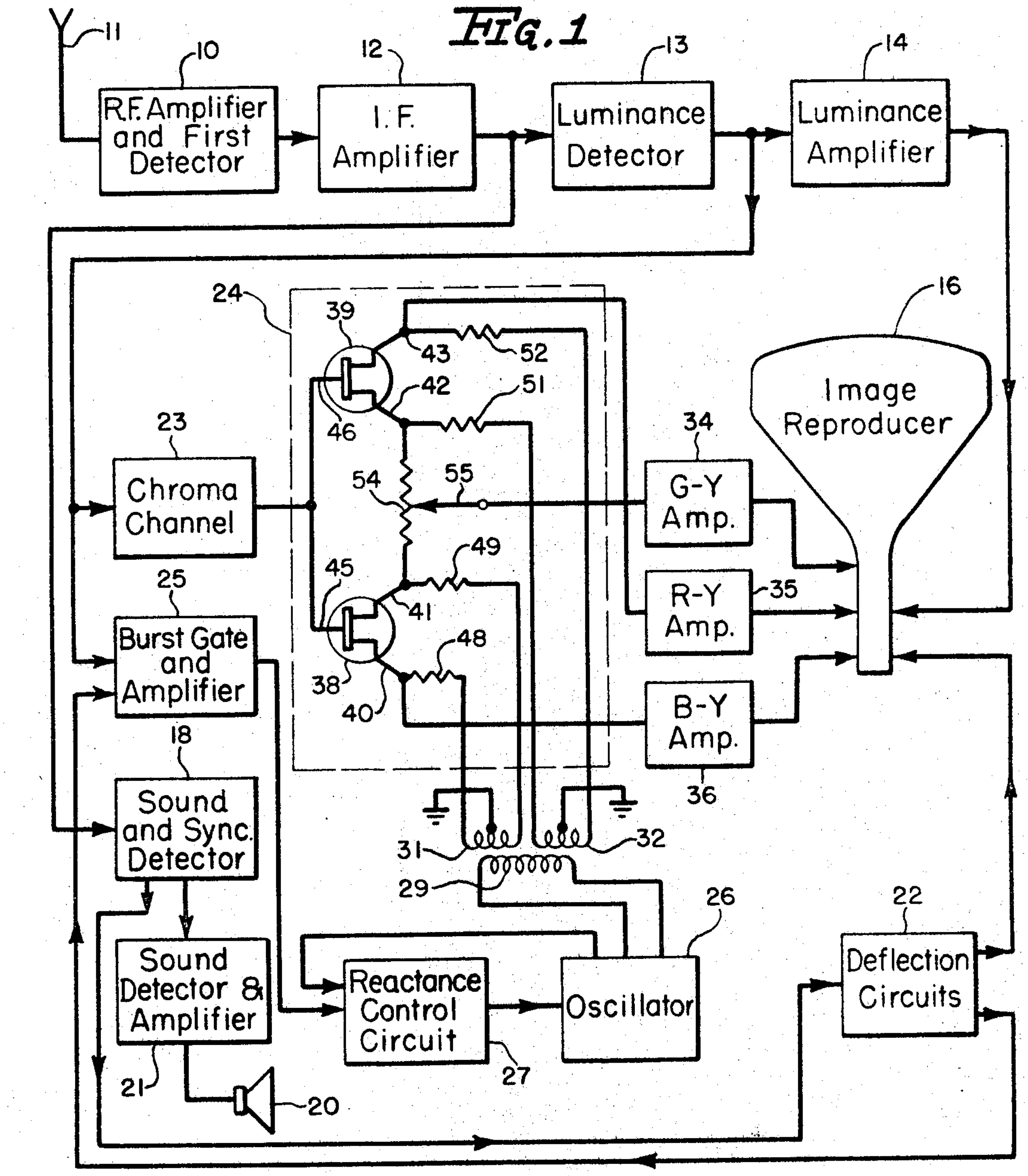

The present invention is directed to a synchronous detector for a color television receiver and, more particularly, to an improved and simplified detector for directly developing three distinct color control signals in response to a received color transmission.

The NTSC standards specify that a color television transmission include a suppressed subcarrier component amplitude and phase modulated with a plurality of color control signals collectively defining the hue and saturation of an image to be reproduced. A conventional television receiver for use with the NTSC system includes an image screen composed of a mosaic of phosphor triads and three electron guns for independently scanning respective elemental areas of each triad. In such a receiver, it is essential to ultimately derive three distinct color control signals, usually selected as the $(R-Y)$, $(B-Y)$ and $(G-Y)$ color difference signals, for intensity modulating the electron beams of respective ones of the three electron guns. Since the color control signals are interrelated, it is often desirable to only demodulate two or these signals at the receiver and then matrix them in proper magnitude and phase to derive the remaining control signal. For instance, assuming as is often convenient, that the $(R-Y)$ and $(B-Y)$ signals are selected for demodulation, then the $(G-Y)$ signal may be defined as follows:

$$(G-Y)=-.51(R-Y)-.19(B-Y)$$

The prior art in this example derives the $(G-Y)$ control signal by use of a separate phase inverting and matrixing network in addition to the demodulating apparatus for the first two control signals; alternatively, the prior art has employed a pair of electron beam switching tubes, gated pentodes or similarly complex devices to develop the $(G-Y)$ component. Although for the most part, these prior art approaches are indeed technically satisfactory, they are relatively complex and expensive. Furthermore, these arrangements are generally peculiarly adapted to sophisticated, multi-control electrode vacuum tubes, equivalents of which are quite difficult, if not impossible, to make by semiconductor or integrated circuit technology.

It is therefore an object of the present invention to provide an improved and simplified synchronous detector for a color television receiver which overcomes the aforenoted disadvantages of the prior art.

It is a further object of the present invention to provide a color detector which is readily susceptible of construction by integrated circuit techniques.

It is a more specific object of the present invention to provide three distinct color control signals from a novel color detector which utilizes a pair of three-terminal bilateral transistor amplifying means as its only active elements.

Accordingly, the invention is directed to a color television receiver including a synchronous detector for developing three distinct color control signals from a received composite signal comprising a suppressed-carrier component phase and amplitude modulated with information collectively defining the hue and saturation of an image to be reproduced. Specifically, in accordance with the invention, the detector comprises synchronizing means for locally deriving a reference signal having a frequency equal to that of the absent subcarrier and a pair of bilateral transistor amplifying means each having a pair of primary electrodes and a control electrode for varying the current flow between the primary electrodes. Input means are provided for applying the suppressed-carrier information component to each of the control electrodes while means are provided for applying the reference signal in phase opposition to the primary electrodes of each of the transistor amplifying means along different phase axes. Individual passive load circuit means are coupled to each of two of the primary electrodes and a common passive load circuit means is coupled to the remaining two of the primary electrodes for deriving first and second color control signals in respective ones of the independent passive load circuits and for deriving a third color control signal, comprising a negative phase vector summation of the first and second control signals in a predetermined weighted relationship, in the common passive load circuit.

Figure 2:
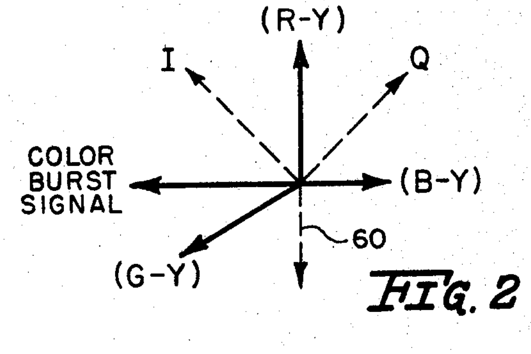

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

FIGURE 1 is a schematic diagram of a color television receiver embodying the novel detector of the present invention; and FIGURE 2 is a vector diagram of the various color control signals and the color synchronizing burst signal and is useful in explaining the operation of the circuit of FIGURE 1.

Referring now specifically to FIGURE 1, the color television receiver there illustrated comprises a radio frequency amplifying and first detector stage 10 which derives an input in conventional fashion from a wave-signal antenna 11. The intermediate frequency output signal from the heterodyning stage of block 10 is coupled to an IF amplifier 12 which, in turn, is coupled both to a luminance detector 13 and to sound and sync circuits to be described. The video frequency output of luminance detector 13 is coupled along two paths, the first being to a luminance amplifier 14 which may include any desired number of amplifying stages and an appropriate time delay network. The amplified video signal provided by luminance amplifier 14 is definitive of relative pictorial brightness or intensity; this signal is applied to an image reproducer 16, which in this case may be a standard three gun, shadow mask color cathode ray tube. The construction of this tube as well as other apparatus shown in block form in the figure is not critical to the present invention and may be of any of a variety of forms well-known to the art.

The image scanning and sound portions of the composite color transmission are also developed from circuits coupled to the output of IF amplifier 12. These circuits include a sound and synchronizing signal detector 18. The sound bearing portion of the output signal from detector 18 is coupled to a loudspeaker 20 by a sound detector and amplifier 21. The remaining signal components are supplied to deflection circuits 22 which are coupled to the deflection system of image reproducer 16.

The signal at the output of luminance detector 13, in addition to including video frequency components, also includes a suppressed-carrier component which, as previously mentioned, is amplitude and phase modulated with a plurality of color control signals collectively defining the hue and saturation of the received image. The modulated subcarrier information is singularly developed in a chroma channel 23 which includes appropriate filter networks and amplifying stages and from there is applied to a novel chrominance detector 24 shown in dashed outline in the drawing. As will be explained more fully later herein, detector 24 by the nature of its unique construction is only responsive to subcarrier modulation at this input. This feature obviously relaxes the bandpass requirements of the chroma channel as the video frequency signals at the output of detector 13 will not substantially affect operation of the color detector.

A demodulator within detector 24 is synchronized by a local reference signal which is derived from a component of the color transmission likewise available at the output of detector 13; the component constitutes short, periodic signal bursts in frequency and phase coherence with one component of the absent subcarrier. The means for developing the local reference signal includes a burst gate and amplifier 25 coupled to receive an input from luminance detector 13. Device 25 is periodically gated on by pulses from deflection circuits 22 so as to be operative only during intervals in which reference burst signals are received. The amplified burst signals from block 25 are coupled to a local oscillator 26 by a reactance control circuit 27. Control circuit 27 compares the reference burst with the output signal of oscillator 26 to generate an error signal which effectively locks the oscillator in a predetermined frequency and phase relation with the reference burst. The local reference signal thus developed is applied through individual phase shifting networks to detector 24. These networks are illustrated as consisting of an injection transformer having a primary winding 29 coupled to each of a pair of secondary windings 31 and 32; these secondaries are oriented such that the reference signals induced therein are displaced from one another by ninety degrees. Furthermore the center-taps of coils 31 and 32 are both grounded for developing the reference signals in phase-opposition between the end terminals of each coil. It will be understood that although only a conventional injection transformer has been illustrated that other phasing networks sources known to the art may also be used such as a pair of properly phase multivibrators, etc.

Detector 24 operates on the foregoing information and reference signals to provide at its output three color difference signals which are individually amplified by amplifiers 34, 35 and 36 and are applied to image reproducer 16, wherein they are separately combined with the luminance signal from luminance amplifier 14 to reproduce images having proper luminance and chrominance characteristics.

Turning now to a more specific consideration of detector 24, it is seen that this circuit comprises a pair of bilateral transistor amplifying means 38 and 39 each having a pair of primary electrodes 40, 41 and 42, 43, respectively. Amplifiers 38 and 39 are also provided with individual control electrodes 45 and 46 for varying the current flow between their respective corresponding pairs of primary electrodes. It is preferred in conjunction with the present invention that devices 38 and 39 be field effect transistors because of the excellent symmetrical bilateral characteristics and attractiveness for integrated circuit applications offered by this class of transistors, although it will be recognized that other kinds of bilateral transistors are satisfactory. For example, it should be understood that a bilateral transistor adequate for use in the circuit of the invention need not be symmetrical; it is only required that the transistor be to some small extent bilateral. Devices 38 and 39 are here selected as insulated gate field effect transistors. These devices are amplifiers whose functional behavior is similar to ordinary bipolar transistors with the additional feature that either of the primary electrodes, designated in the art as source and drain electrodes to indicate the direction of current flow through the devices, operates with approximately equal efficiency as a "collector" or as an "emitter" electrode under proper biasing conditions. The gate or control electrodes of these devices, unlike those of most ordinary transistors, pose an extremely high input impedance to an applied signal which, of course, is desirable to minimize loading on preceding circuitry. Such field effect devices are presently commercially manufactured by a number of companies and are per se well-known to the electronics art; accordingly, further details need not be given here.

In accordance with the subject invention, the output terminal of chroma channel 23 is coupled to apply the color subcarrier modulation in like phase to gate electrodes 45 and 46 of transistors 38 and 39. The source and drain electrodes 40 and 41 of transistor 38 are connected to the grounded center-tap of coil 31 through load resistors 48 and 49 and respective opposite end terminals of this coil. Similarly, source and drain electrodes 42 and 43 of transistor 39 are coupled by respective load resistors 51 and 52 through opposite end terminals of coil 32 to its grounded intermediate tap. By these connections, the subcarrier reference signal developed in local oscillator 26 is applied in phase opposition to the primary electrodes of transistor 38 along one phase axis and in phase opposition to the primary electrodes of transistor 39 along a different phase axis.

Primary electrodes 41 and 42 of transistors 38 and 39 are coupled to opposite terminals of a common passive load circuit means which here consists essentially of a resistor 54. An intermediate tap 55 of resistor 54 is coupled as a singular input to $(G-Y)$ amplified 34. Electrodes 40 and 43 of transistors 38 and 39 are likewise singularly coupled to control signal amplifiers, namely, the $(B-Y)$ amplifier 36 and the $(R-Y)$ amplifier 35.

With the exception of detector 24, the color television receiver of FIGURE 1 is quite conventional and, accordingly, only a brief description of its operation need be given here. A carrier modulated by a composite color signal is intercepted by antenna 11 and is amplified and translated to an intermediate frequency by the amplifier and detector of block 10. Intermediate frequency amplifier 12 further amplifies this signal, after which it is applied to both luminance detector 13 and sync and sound detector 18. The detected video components from detector 13, which represent the luminance content of a color telecast, are coupled with appropriate time delay and amplification through luminance amplifier 14 to image reproducer 16.

The audio information portion of the output signal from sync and sound detector 18 is detected and amplified by conventional audio circuits 21 to drive loudspeaker 20. Detector 18 is also coupled to deflection circuits 22 which are responsive to the detected scanning information to develop the usual horizontal and vertical sweep signals required by image reproducer 16.

Chrominance channel 23 couples chrominance signals from luminance detector 13 to color detector 24. The frequency response characteristic of the chrominance channel is such that only that portion of the received signal generally corresponding to the color modulated subcarrier is translated to the control electrodes of the detector transistors.

Meanwhile, the adjacent burst gate and amplifier 25 is selectively responsive to the burst signal portion of the transmission and is gated on by pulses from the deflection circuit 22 so as to be operative only during those intervals in which burst signals are received. The amplified burst signal is compared in frequency and phase with the local oscillation signal in reactance control circuit 27, and a control signal is generated corresponding to any phase error therebetween. This control signal is applied to the oscillator to effectively lock it in an identical frequency and a predetermined phase relationship with the reference burst. The local reference signal thus derived is supplied by injection transformer 29, 31, 32 in a different phase to the primary electrodes of each detector transistor.

At this point, it is advantageous in understanding the operation of the circuit of the invention to consider the vector diagram of FIGURE 2. This figure illustrates the relative phase orientation of the three primary color control signals and the color synchronizing burst signal. As shown, the $(B-Y)$ control signal is in quadrature with the $(R-Y)$ signal and is in phase opposition to the color burst. The $(G-Y)$ control signal leads the $(R-Y)$ signal by 146.8 degrees. As is well understood in the art, a shifting of the local reference signal into phase coincidence with any one of the color difference signals permits that difference signal to be demodulated by synchronous detection methods. Furthermore, when two of the color control vectors are demodulated then the third color difference signal may be derived, without demodulation, by proper vector addition of the two demodulated difference signals. In fact, as will be discussed in further detail later herein, demodulation of any two color vectors, such as the I and Q vectors illustrated in FIGURE 2 is adequate to provide all of the information necessary to develop the three primary color difference signals.

In the preferred embodiment of the invention shown in FIGURE 1, the $(R-Y)$ and $(B-Y)$ color difference signals are each synchronously detected by developing from the color burst signal individual local reference signals in phase coherence with respective ones of these color control signals; the third or $(G-Y)$ control signal is developed by a vector addition of the negative phase components of the first two control signals in a predetermined amplitude relationship. According to the invention, the negative phases of the $(R-Y)$ and $(B-Y)$ signals required for creating the $(G-Y)$ signal are inherently developed by proper connection of the detector to perform its primary demodulating function. Also, as will be shown, the detector possesses an extraordinarily high demodulation efficiency.

The specific operation of the detector circuit of the invention is quite complex and therefore for simplicity and clarity of explanation, it will be assumed initially that only transistor 39 is operative and that electrode 43 of this transistor receives a positive, constant operating bias of suitable polarity through its load resistor 52 and that the only switching signal present is that from the left-hand side of coil 32. This signal is of a phase corresponding to the dashed arrow 60 of FIGURE 2. Under these conditions, it will be recognized by those skilled in the art that, by analogy to conventional bipolar transistors, electrode 43 is biased to function effectively as a collector electrode and that electrode 42 is effectively an emitting electrode. The reference signal at this emitter alternately gates the transistor on and off in phase opposition to the $(R-Y)$ modulation present at the transistor base electrode. It can be shown that under these circumstances an intermodulation product is created across emitter load resistor 51 which has a component equal to $-(R-Y)$ and that by transistor action this signal component is developed across load resistor 52 in an opposite phase, namely, as an $(R-Y)$ signal.

It will now be assumed that the converse of the foregoing exists, namely, that electrode 42 receives a constant positive operating bias and electrode 43 is subjected to the reference signal from the right-hand side of coil 32. This signal is, of course, in phase coincidence with the $(R-Y)$ vector of FIGURE 2. Hence, electrode 42 is now effectively the collector and electrode 43 is the emitter. In this case there is developed in resistor 52 an intermodulation product having a component equal to the $(R-Y)$ color control signal. This signal is transferred by transistor action to resistor 51 in an opposite phase, i.e., $-(R-Y)$. It will be recognized that in both of the foregoing instances an $(R-Y)$ component appears across load resistor 52 and a $-(R-Y)$ component is developed across load resistor 51, that is, the signal components across each load resistor combine in an additive sense. Dismissing the simplifying assumptions, it should now be recognized that the alternate operation of electrodes 42 and 43 as a collector and an emitter by concurrent application of the reference signals developed in the opposite halves of coil 32 provides exactly the aforestated result.

An identical procedure occurs with regard to detector transistor 38 excepting only that the switching signal components applied to its primary electrodes 41 and 40 are respectively in phase and 180 degrees out of phase with the $(B-Y)$ color control signal. Thus, there is developed across load resistor 48 of this transistor a $(B-Y)$ color signal component and across load resistor 49 a $-(B-Y)$ signal component. The $(R-Y)$ and $(B-Y)$ color difference signals are directly coupled to amplifiers 35 and 36 and are applied to image reproducer 16 in conventional fashion. It is the unusual characteristic of the detector of the invention that any demodulated information present at transistor control electrodes 45, 46 is translated to its primary electrodes as modulation of the reference signal frequency applied to the primary electrodes, that is, the detector is signal balanced. It will be recognized that this feature relaxes to some extent the requirements on the filtering networks of amplifiers 34, 35 and 36 and the bandpass filter of the chroma channel.

The $(G-Y)$ control signal is derived by setting the intermediate tap 55 of resistor 54 so that the two demodulated control signals $-(R-Y)$ and $-(B-Y)$ are additively combined in a proportion set by the equation for $(G-Y)$ given previously herein. Specifically, the impedance of resistor 54 below tap 55 should be approximately 2.7 times greater than that above the tap. The $(G-Y)$ control signal likewise is applied by an amplifier 34 to image reproducer 16. The mechanics of image reproduction from these control signals and from the luminance and scanning information is well-known and understood in the art and for that reason will not be given here.

As previously mentioned herein, it is not necessary that the $(R-Y)$ and $(B-Y)$ control signals be selected for demodulation; it is understood that any combination of two of the three primary control signals may be selected for demodulation and the remaining signal developed by matrixing. Furthermore, it is not even necessary to demodulate any of the primary color control signals. For example, to take full advantage of the bandwidth of the color transmission, demodulation should theoretically occur along the I and Q axes shown in FIGURE 2 and the three primary control signals derived by matrixing of these quadrature phase related secondary control signals. The illustrated circuit of the present invention has full utility in any of these contexts.

It should also be noted that each of the detector transistors in the circuit of the invention, by operating bilaterally, provides an effective detection efficiency which is approximately twice that of conventional transistor detectors of the average type or approximately 65%. The detector of the invention constructed with the following component types and component values was successfully operated in an otherwise conventional color television receiver:

| | | |
|---|---|---|
| Transistors 38, 39 | | (1) |
| Resistor 48 | ohms | 1.5K |
| Resistor 49 | do | 1.5K |
| Resistor 51 | do | 1.5K |
| Resistor 52 | do | 1.5K |
| Resistor 54 | do | 10K |

[1] Type No. FT-57 manufactured by the Fairchild Semiconductor Co.

It will be understood that the above component particulars are given by way of example only and are in no sense a limitation or restriction on the construction of the circuit of the present invention.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. In a color television receiver, a synchronous detector for developing three distinct color control signals from a received composite signal comprising a suppressed-carrier component phase and amplitude modulated with information which collectively defines the hue and saturation of an image to be reproduced, said detector comprising:
   synchronizing means for locally deriving a reference signal having a frequency equal to that of the absent subcarrier;
   a pair of bilateral transistor amplifying means each having a pair of primary electrodes and a control electrode for varying the current flow between said primary electrodes;
   input means for applying said suppressed-carrier information component to each of said control electrodes;
   means for applying said reference signal in phase opposition to said primary electrodes of each of said transistor amplifying means along different phase axes;
   and individual passive load circuit means coupled to each of two of said primary electrodes and common passive load circuit means coupled to the remaining two of said primary electrodes for deriving first and second color control signals in respective ones of said independent passive load circuits and for deriving a third color control signal, comprising a negative phase vector summation of said first and second control signals in a predetermined weighted relationship, in said common load circuit.

2. The combination according to claim 1 in which said information component is applied in a like phase to both of said control electrodes.

3. The combination according to claim 2 in which each of said pair of bilateral amplifying means is a field effect transistor.

4. The combination according to claim 3 in which said field effect transistors are of the insulated gate field effect type.

5. The combination according to claim 4 in which said individual load circuits each consist essentially of a resistor coupled to said means for applying said reference signal and in which said common load circuit includes a voltage divider having opposite end terminals coupled between said remaining primary electrodes and having an intermediate tap for deriving said third control signal.

6. The combination according to claim 5 in which said load resistors are approximately equal in value and the resistances of said voltage divider on opposite sides of said intermediate tap are related in magnitude by approximately the ratio 2.7:1 and further in which said different phase axes are displaced by approximately 90 degrees.

References Cited

UNITED STATES PATENTS

| | | | |
|---|---|---|---|
| 3,238,463 | 3/1966 | Inaba | 178—5.4 |
| 3,363,189 | 1/1968 | Oswald | 178—5.4 |

RICHARD MURRAY, Primary Examiner

JOHN MARTIN, Assistant Examiner

U.S. Cl. X.R.

329—50